US006043456A

United States Patent [19]

Meyer et al.

[11] Patent Number: 6,043,456

[45] Date of Patent: Mar. 28, 2000

[54] METHOD AND DEVICE FOR REGULATING THE TEMPERATURE IN A LASER-OPERATED PRINTING PLATE IMAGING UNIT OF A PRINTING PRESS, PARTICULARLY OF AN OFFSET PRINTING PRESS

[75] Inventors: Helmut Meyer, Wiesloch; Johann Schunn, Leimen, both of Germany

[73] Assignee: Heidelberger Druchmaschinen Aktiengesellschaft, Heidelberg, Germany

[21] Appl. No.: 08/850,228

[22] Filed: May 2, 1997

[30] Foreign Application Priority Data

May 2, 1996 [DE] Germany ........................... 196 17 552

[51] Int. Cl.[7] ............................... H01S 3/04; H01S 3/13; G03G 15/20

[52] U.S. Cl. ............................... 219/216; 372/34; 372/35

[58] Field of Search .............................. 219/216; 372/34, 372/38, 43, 35; 257/467; 107/470, 487

[56] References Cited

U.S. PATENT DOCUMENTS

| | | | |
|---|---|---|---|
| 3,686,543 | 8/1972 | Nyul | 372/35 |
| 4,399,541 | 8/1983 | Kovats et al. . | |
| 4,884,279 | 11/1989 | Odagiri . | |
| 4,924,473 | 5/1990 | Burgyan et al. | 372/38 |
| 5,105,429 | 4/1992 | Mundinger et al. | 372/35 |
| 5,105,430 | 4/1992 | Mundinger et al. | 372/35 |
| 5,262,658 | 11/1993 | Jankowski | 257/467 |
| 5,265,113 | 11/1993 | Halldorsson et al. | 372/35 |
| 5,309,458 | 5/1994 | Carl | 372/34 |
| 5,331,652 | 7/1994 | Rapoport et al. | 372/35 |
| 5,351,617 | 10/1994 | Williams et al. . | |
| 5,400,351 | 3/1995 | Montgomery et al. | 372/34 |
| 5,406,172 | 4/1995 | Bennett | 315/112 |
| 5,488,625 | 1/1996 | Nakamori et al. | 372/43 |
| 5,499,258 | 3/1996 | Kawano et al. | 372/34 |
| 5,680,410 | 10/1997 | Kim et al. | 372/34 |
| 5,828,683 | 10/1998 | Freitas | 372/35 |

FOREIGN PATENT DOCUMENTS

| | | |
|---|---|---|
| 0477841A2 | 4/1992 | European Pat. Off. . |
| 3342111A1 | 5/1984 | Germany . |
| 3603548 A1 | 10/1986 | Germany . |
| 284784A5 | 11/1990 | Germany . |
| 2737345C3 | 7/1991 | Germany . |
| 9302494.0 | 6/1993 | Germany . |
| 4212777C2 | 3/1994 | Germany . |

OTHER PUBLICATIONS

"Thermoelektrische Temperaturstabilisierung von Laserdioden und Detektoren", Michael Bauer, München, Opto Elektronik Magazin, vol. 5, No. 3, 1989, pp. 321–324.

"A scanning temperature control system for laser diodes", Bowring et al., Sci. Technol. 4, 1993, pp. 1111–1113.

*Primary Examiner*—Joseph Pelham

*Attorney, Agent, or Firm*—Herbert L. Lerner; Laurence A. Greenberg; Werner H. Stemer

[57] ABSTRACT

A method for regulating the temperature in a printing plate imaging unit of a printing press, particularly an offset printing press, the imaging unit being operable with laser light generated by a laser diode unit which is switched on and off in accordance with an image pattern to be produced on the printing plate, includes operating, alternatively with the laser diode unit, a heat source arranged near the laser diode unit so that the temperature of the laser diode unit is as constant as possible.

13 Claims, 3 Drawing Sheets

METHOD AND DEVICE FOR REGULATING THE TEMPERATURE IN A LASER-OPERATED PRINTING PLATE IMAGING UNIT OF A PRINTING PRESS, PARTICULARLY OF AN OFFSET PRINTING PRESS

BACKGROUND OF THE INVENTION

Field of the Invention

The invention relates to a method and a device for regulating the temperature in a laser-operated printing plate imaging unit of a printing press, particularly an offset printing press.

For the imaging or image formation of printing plates for printing presses, digitally operated imaging or image forming units are increasingly used presently in addition to the conventional method of film exposure; the imaging units receive the image data in the form of digital bit-patterns generated in the pre-press system and transfer them to the printing plate. For this purpose, the imaging units possess a light source, and the light from the light source is focused on a respective location of the printing plate through an optical lens system, the light source being switched on or off, depending upon whether or not a pixel is to be produced at the respective location.

U.S. Pat. No. 5,351,617 discloses a laser-operated imaging unit for a printing plate provided with a special coating and mounted on the plate cylinder of an offset printing press, the laser light of the imaging unit being generated through a laser diode unit and being subsequently conducted via an optical light-guiding cable to an optical focusing unit arranged near the plate cylinder, the focusing unit being moved in a motorized manner across the surface of the plate cylinder, in parallel with the longitudinal axis of the plate cylinder, and the laser light being focused on the respective locations on the printing plate. By rotating the plate cylinder accordingly, imaging is performed on the entire surface of the printing plate mounted on the cylinder.

The aforementioned U.S. Pat. No. 5,351,617 furthermore shows a device, by which multiple optical focusing units connected to respective laser-light sources by optical light-guiding cables are moved across a flat printing plate and illuminate or expose it at the respective location.

With the aforedescribed imaging units operated by laser diodes, a problem exists in that the intensity of the laser light is greatly influenced by the temperature of the respective laser-light source, in this case a laser diode. Due to the conventional substantially exponential temperature-dependency of the intensity of the generated laser light, temperature variations from 0.5° C. to 2° C., in the case of a laser diode, already have such a disadvantageous effect upon the imaging results, that the quality deficiencies in the finished printed image caused thereby can easily be noticed by the human eye.

The quality deficiencies result due to a varying light intensity of the laser light caused by the temperature of the respective laser diode being too high or too low, the pixels to be produced on the printing plate vary greatly, so that the printed image created with the printing plate shows defects leading to the aforedescribed noticeable quality deficiencies.

With the imaging of a printing plate, the temperature variations of the laser diodes are particularly caused by the fact that the laser diodes, in the switched-on state thereof, convert a great part of the electrical energy fed thereto into joulean heat, and in the switched-off state thereof, i.e., in the regions where no imaging takes place, the laser diodes do not generate any heat. In practice, the quality deficiencies occur especially in those areas of the printing plate where pixels are produced by the respective laser diode unit only sporadically, because the laser diode unit, having been switched off for a very long period of time, has cooled off and, when switched on again, generates a reduced light intensity because of the required heating-up time.

SUMMARY OF THE INVENTION

It is accordingly an object of the invention to provide a method for regulating the temperature in a printing plate imaging unit operated with laser light, whereby the temperature of the laser-light source generating the laser light, particularly a laser diode, can be kept constant to a great extent by simple expediencies.

It is a further object of the invention to provide a device for keeping the temperature of the laser-light source of a printing plate imaging unit constant, particularly a laser diode, by simple devices and in an efficient and low-cost manner.

With the foregoing and other objects in view, there is provided, in accordance with one aspect of the invention, a method for regulating the temperature in a printing plate imaging unit of a printing press, particularly an offset printing press, the imaging unit being operable with laser light generated by a laser diode unit which is switched on and off in accordance with an image pattern to be produced on the printing plate, which comprises, operating, alternatively with the laser diode unit, a heat source arranged near the laser diode unit so that the temperature of the laser diode unit is as constant as possible.

In accordance with another mode, the method according to the invention includes increasing the heat quantity per unit time emitted by the heat source in a switched-off state of the laser diode unit, and decreasing the heat quantity per unit time in a switched-on state of the laser diode unit.

In accordance with a further mode of the method, the heat quantity per unit time emitted by the heat source is substantially equal to the heat quantity per time unit emitted by the laser diode unit.

In accordance with an added mode, the method according to the invention includes operating the heat source, in the switched-on state of the laser diode unit, so that the heat source emits a given basic heat quantity per unit time which is smaller than the heat quantity per time unit emitted by the laser diode unit, and operating the heat source, in the switched-off state of the laser diode unit, so that the heat source emits a second larger heat quantity, the first and the second heat quantities being of such value, that a temperature difference between the switched-on and the switched-off state of the laser diode unit is minimal.

In accordance with an additional mode of the method, the difference between the first and second heat quantities is substantially equal to the difference between the heat quantity emitted by the switched-on laser diode unit and the second heat quantity.

In accordance with yet another mode, the method of the invention includes preheating at least one of the laser diode unit and the heat source to a predetermined temperature.

In accordance with yet a further mode, the method of the invention includes cooling at least one of the laser diode unit and the heat source to a predetermined temperature.

In accordance with yet an added mode, the method of the invention includes thermally insulating at least one of the laser diode units and the heat sources against the environment.

In accordance with another aspect of the invention, there is provided a device for regulating the temperature in a laser-operated printing plate imaging unit of a printing press, particularly an offset printing press, having at least one laser dioxide unit, which is switchable on and off in accordance with a pixel pattern to be produced on the printing plate, for generating laser light, comprising an electrical heating element arranged in the vicinity of the laser diode unit for generating, alternatively with the laser diode unit, a first heat quantity in a switched-on state of the laser diode unit and a second larger heat quantity in a switched-off state of the laser diode unit.

In accordance with another feature of the invention, the second heat quantity is substantially equal to a heat quantity generated by the laser diode unit, and the first and smaller heat quantity has a value of zero.

In accordance with a further feature of the invention, the second heat quantity generated by the heating element in the switched-off state of the laser diode unit is of such value that the laser diode unit has a temperature equal to a predetermined reference value.

In accordance with an added feature of the invention, the first heat quantity generated by the heating element in the switched-on state of the laser diode unit has a value equal to the second heat quantity reduced by the difference between the heat quantity generated by the laser diode unit and the second heat quantity.

In accordance with an additional feature of the invention, the heating element is formed of an electrical component for generating joulean heat, the electrical component being connected to a source selected from a group consisting of electrical voltage and current sources in accordance with the heat quantity to be generated.

In accordance with a concomitant feature of the invention, the device includes a control unit, and an electronic phase opposition circuit having a first power transistor controlled by the control unit for regulating current flow through the heating element, and a second power transistor controlled by the control unit via an inverting Schmitt trigger switch for regulating current flow through the laser diode unit.

The invention of the instant application offers the special advantage that, even with imaging devices having a greater number of individual laser diode units and associated optical focusing systems, a high degree of stability and thereby a high quality level can be achieved when producing the individual pixels on the printing plate over the entire image. It is a further advantage of the device according to the invention, that existing printing plate imaging units for even or flat printing plates, as well as for printing plates mounted on a plate cylinder, can be retrofitted with the device of the invention in a relatively simple manner and at low cost.

Other features which are considered as characteristic for the invention are set forth in the appended claims.

Although the invention is illustrated and described herein as a method and device for regulating the temperature in a laser-operated printing plate imaging unit of a printing press, particularly of an offset printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 3 is a plot diagram of the voltage supplied to the resistor and the laser diode, respectively, and of the quantity of heat given off by the resistor and the diode, respectively, in a first exemplary embodiment of the invention, wherein the voltage applied to the resistor is regulated down to zero when the laser diode is switched on; and FIG. 4 is a plot diagram like that of FIG. 3 for a different embodiment of the invention wherein, in the switched-off state of the laser diode unit, a given quantity of heat is generated by the heating element, the heat quantity being reduced by a predetermined value after the laser diode unit is switched on.

DESCRIPTION OF THE PREFERRED EMBODIMENTS

Figure 1:
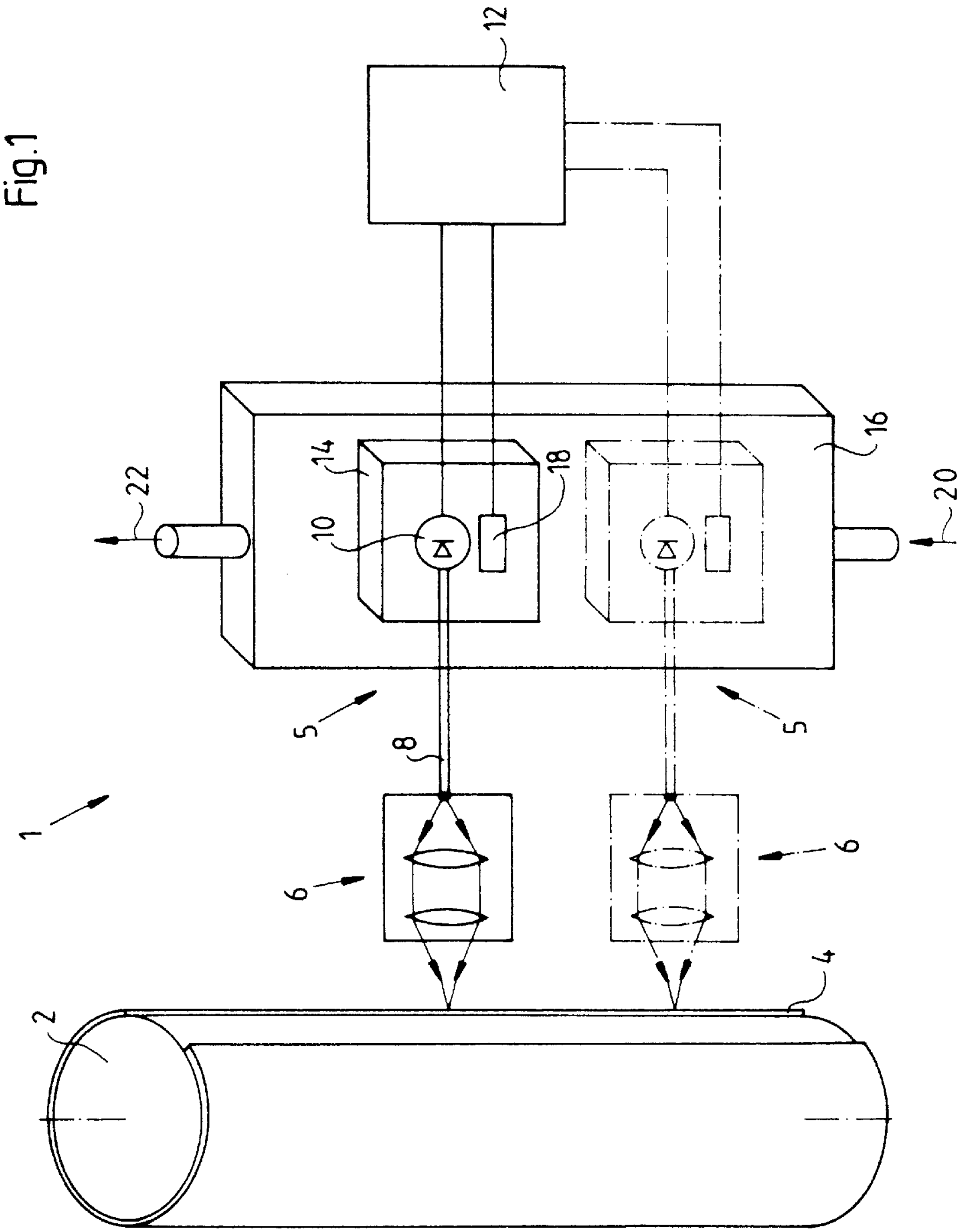
FIG. 1 is a diagrammatic and schematic view of two printing plate imaging units arranged at a plate cylinder of a printing press, the imaging units including temperature regulating devices according to the invention.

Referring now to the drawings and, first, particularly to FIG. 1 thereof, there is shown therein a device 1 for imaging or forming an image on a printing plate 4 mounted on a plate cylinder 2 of a printing press. The device 1 includes one or more, for example, sixteen individual printing plate imaging units 5 of which, for illustrative reasons, only two units are illustrated in FIG. 1. The imaging units 5 for imaging the printing plate 4 mounted on the plate cylinder 2 can also be used for imaging flatly extending printing plates. Each of the imaging units 5 includes an optical focusing system 6 arranged near the printing plate 4, the focusing system 6 being connected to a laser diode unit 10 via an optical light conductor 8. The optical focusing system 6 focuses the laser light generated by the laser diode unit 10 on a location or spot on the printing plate which is equivalent to a pixel to be produced, thereby removing the surface layer of the printing plate at that location or spot, so that an underlying ink-receptive layer is exposed. The construction and composition of such a printing plate have become known, for example, from the aforementioned U.S. Pat. No. 5,351,617 and are consequently not discussed in detail herein.

The laser diode unit 10 is controlled by a control unit 12 which causes the laser diode unit 10 to be switched on or off, depending upon whether a pixel is or is not to be produced in accordance with a bit-pattern created in the pre-press stage.

In the preferred embodiment of the invention shown in FIG. 1, the laser diode units 10 are accommodated in a housing 14 which is fastened to a carrier or basic body 16. In the vicinity of the laser diode unit 10, preferably within the housing 14, a heating element 18 is disposed which is actuated by the control unit 12. The actuation of the heating element 18 by the control unit 12 occurs in alternation with or in phase opposition to the laser diode unit 10 in a manner that, when the laser diode unit 10 is switched off, the heating element 18 is actuated to heat up the switched-off laser diode unit 10. When the laser diode unit 10 is switched on, i.e., when imaging the printing plate with a pixel, the heating element 18 is switched off, so that no thermal energy is generated by the heating element 18 during the time the laser diode unit 10 is switched on. In the preferred embodiment of the invention, the heating element 18 is formed by an ohmic resistance which is connected in alternation with the laser diode unit 10 to a respective high or low-voltage source. Alternatively, the heating element 18 may be formed of any other electronic component generating joulean heat, which would be connected to a respective current and/or voltage source in phase opposition to the laser diode unit 10. Such a component may be, for example, a transistor, a diode or a so-called Peltier element or the like.

Instead of the heating element 18 being arranged in the housing 14 of the laser diode unit 10, as shown in FIG. 1, the heating element 18 can also be arranged outside of the housing 14, for example, on the housing 14 or on the carrier body 16. In another embodiment of the invention, there is also the possibility of cooling or heating the carrier body 16 of the device 1 carrying the imaging unit 5, for example, by having the carrier body 16 formed with a hollow interior through which a suitable cooling or heating medium of a desired temperature flows, as indicated by the arrows 20, 22. Instead of a cooling or heating medium streaming through the carrier body 16, the latter can also be heated electrically. Consequently, an independent preheating temperature, which is not dependent upon the temperature regulation by the heating element 18, can be superposed on the laser diode unit 10 and/or the heating element 18, so that, for example, the operating point of a printing plate imaging device 1 made up of multiple units, e.g., sixteen printing plate imaging units 5, can, for example, be changed in common or jointly for all imaging units 5 in accordance with the respective environmental or ambient temperature.

Figure 2:
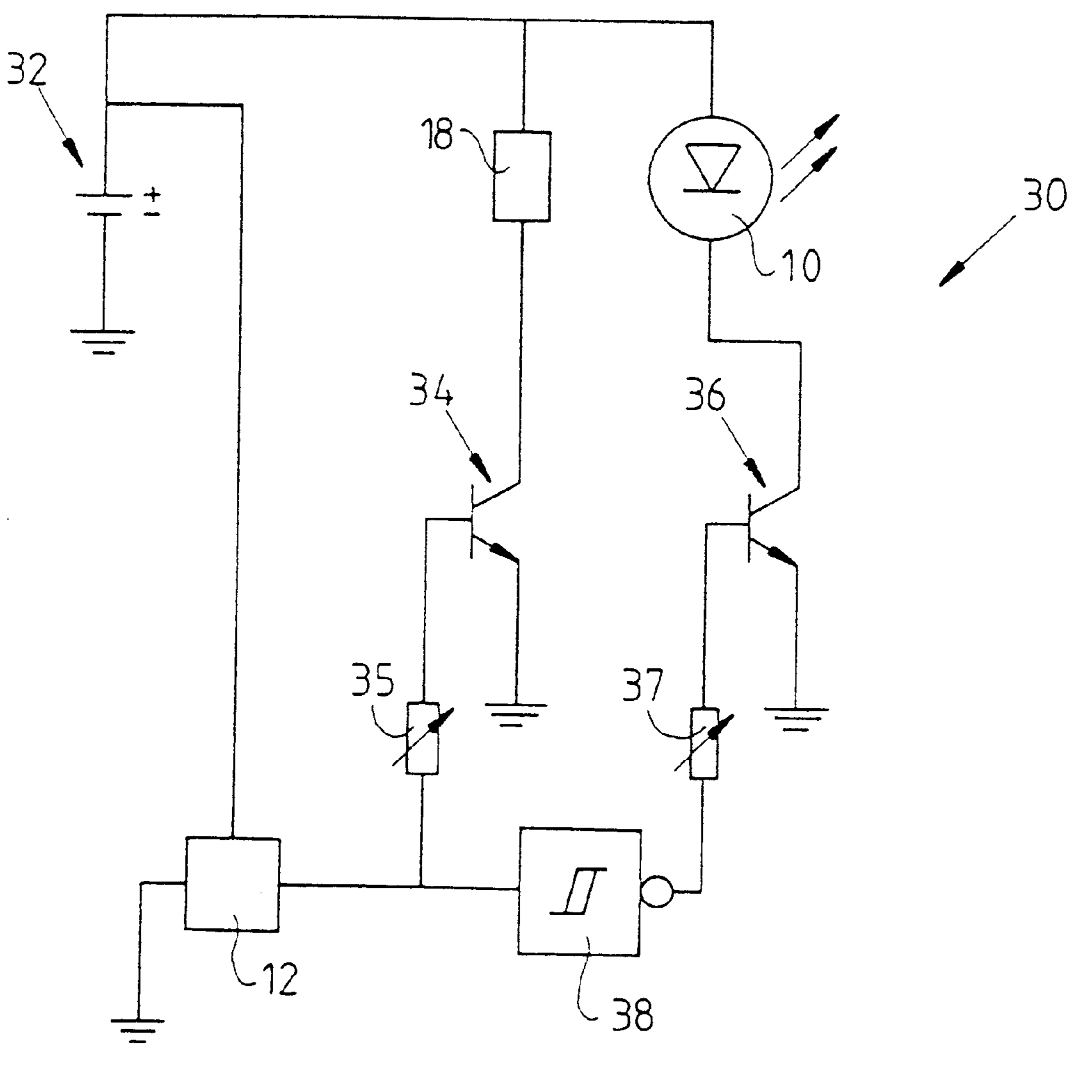
FIG. 2 is an electrical circuit diagram of a preferred embodiment of the temperature regulating device according to the invention.

The regulation of the temperature of the laser diode unit 10 by the heating element 18 can be performed, for example, by an electronic circuit 30 illustrated in FIG. 2. The circuit 30 possesses a power and/or voltage source 32 having a pole, for example, a plus-pole, to which the control unit 12, as well as the heating unit 18 and, in parallel therewith, the laser diode unit 10 are connected. The heating element 18, as well as the laser diode unit 10, are further connected with the second pole of the power and/or voltage source 32 via respectively assigned power transistors 34 and 36. The base of the power transistor 34 associated with the heating element 18 is connected to the control unit 12 preferably via a fixed or controllable resistor 35. The base of the power transistor 36 associated with the laser diode unit 10 is preferably connected to the control unit 12 via a second fixed or controllable resistor 37 as well as via an inverting Schmitt trigger switch 38. The control unit 12 controls the bases of the power transistors 34 and 36 in phase-opposition or push-pull operation, so that when the laser diode unit 10 is switched off, current flows through the heating element 18, and the magnitude of the current can be set via the resistor 35 accordingly for the respective heating element 18 of a printing plate imaging unit 5. The signal applied to the base of the power transistor 36 associated with the laser diode unit 10 is inverted due to the inverting Schmitt trigger switch 38, so that the power transistor 36 is blocked and the laser diode unit 10 remains switched off. For switching on the laser diode unit 10, a signal of reversed polarity is generated by the control unit 12, and the power transistor 34 of the heating element 18 is blocked accordingly and the power transistor 36 is switched through and becomes conductive, due to the inverting effect of the Schmitt trigger switch 38, so that current flows through the laser diode unit 10, the magnitude of that current being adjustable via the resistance 37. The control unit 12 generates the signals in accordance with a pixel to be produced on the printing plate 4.

Figure 3:
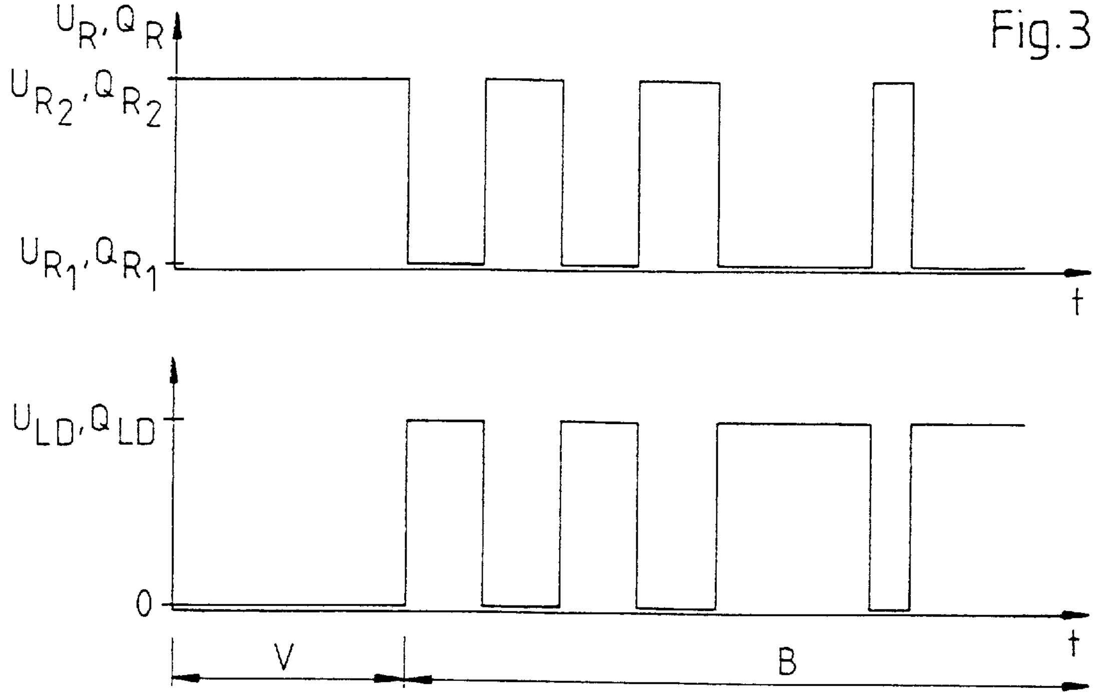

The course of the voltage $U_R$ applied to the heating element 18 as well as the course of the voltage $U_{LD}$ applied to the laser diode unit 10 are illustrated in FIG. 3 in idealized form. As is apparent from FIG. 3, the heating element 18, during the preheating phase V, is connected to the voltage source 32 or equivalently to a respective current source, thereby emitting a given quantity $Q_R$ of heat, the amount of which being preferably regulated via the controllable resistor 35 so that the temperature of the laser diode unit 10, which is switched off at this time, is set to a desired working temperature. The voltage $U_{LD}$ applied to the laser diode unit 10 during the preheating phase V in this embodiment of the invention is preferably equal to zero volts, so that the heat quantity per unit time generated by the laser diode unit 10 is accordingly equal to 0 joules. In the subsequent imaging phase B, the laser diode unit 10 is switched on by applying the voltage $U_{LD}$ thereto, and simultaneously, i.e., in alternation or phase opposition, the heating element 18 is switched off. In this embodiment of the invention, the heat quantity per unit time $Q_{LD}$ emitted by the laser diode unit 10 and the heat quantity per unit time $Q_R$ emitted by the heating element 18 are preferably substantially equal, the heat quantity $Q_R$ emitted by the heating element 18 being also able to be smaller or larger than the heat quantity $Q_{LD}$ emitted by the laser diode unit 10, depending upon the arrangement of the heating element 18 and the preheating of the carrier body 16, respectively, or the total emitted thermal energy. A balancing or adjustment of the heat quantities can be performed, for example, via the controllable resistors 35 and 37 of the circuit shown in FIG. 2, preferably so that the temperature variations between the switched-on state and switched-off state of the laser diode unit 10 are minimized.

Figure 4:
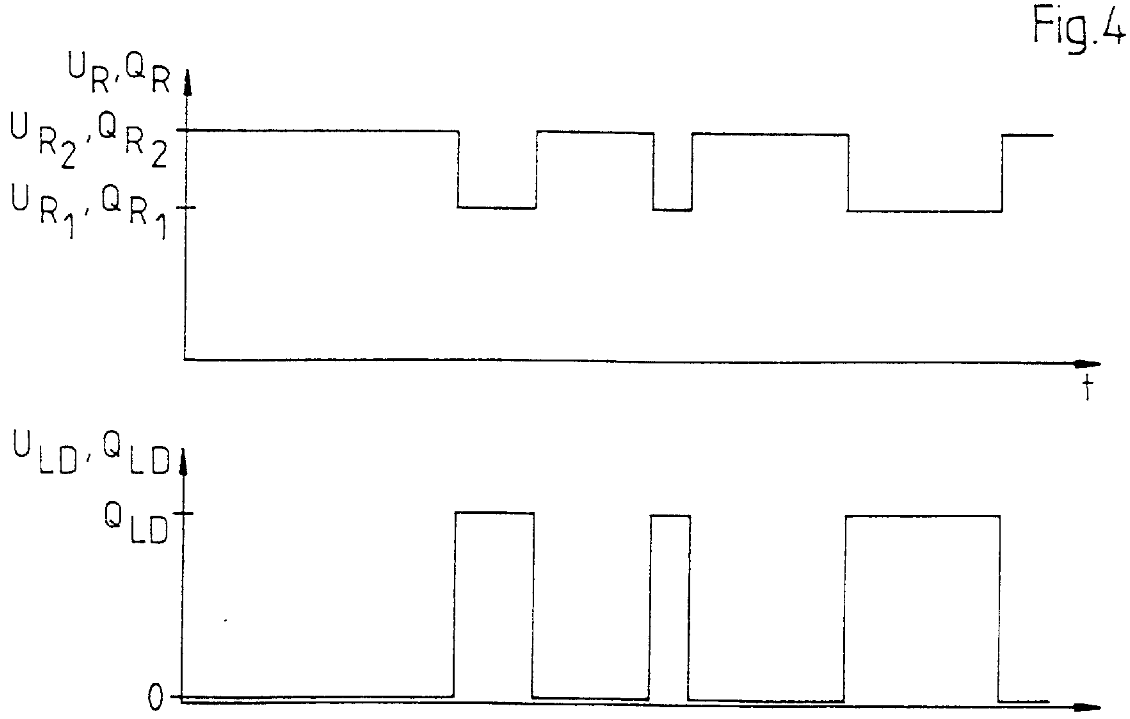

In a further embodiment of the invention shown in FIG. 4, the heating element 18 has a preferably adjustable base voltage $U_{R1}$ applied thereto and a suitable base current, respectively, when the laser diode unit 10 is switched on, and the heating element 18 emits a first basic heat quantity $Q_{R1}$ which is illustrated in the upper diagram of FIG. 4. When the laser diode unit 10 is switched off, the heating element 18 has a second higher voltage $U_{R2}$ applied thereto and generates a heat quantity $Q_{R2}$ per unit time. The difference between the heat quantities $Q_{R1}$ and $Q_{R2}$ emitted by the heating element 18 in this embodiment of the invention is preferably selected so that the temperature variations or the temperature difference between the switched-off and the switched-on state of the laser diode unit 10 will be minimal. The thermal energy value of the heat quantity $Q_{R1}$ generated by the heating element 18 in the switched-on state of the laser diode unit 10 is preferably equal to the value of the heat quantity $Q_{R2}$ reduced by the difference between the heat quantity $Q_{LD}$ emitted by the laser diode unit 10 and the heat quantity $Q_{R2}$; or as expressed in the following formula:

$$Q_{R1}=Q_{R2}-(Q_{LD}-Q_{R2})$$

wherein the heat quantity $Q_{R2}$ is preferably smaller than the heat quantity $Q_{LD}$.

The heat quantities $Q_{R1}$, $Q_{R2}$ and $Q_{LD}$ as well as the respective voltages $U_{R1}$, $U_{R2}$ and $U_{LD}$, particularly the difference between $Q_{R2}$ and $Q_{R1}$, may have another, preferably empirically determined value, however, which is in accordance with the heat quantity per unit time emitted to the environment, the thermal conductivity of the individual components, the arrangement and construction of the heating element 18, the preheating of the carrier body 16 or the housing 14, and so forth, by setting the voltage and/or the current via the controllable resistances 35 and 37 so that the temperature differences of the laser diode unit 10 will be minimal.

The switching-on of the laser diode unit 10 and the corresponding switching-off of the heating element 18 preferably take place simultaneously. However, it is also possible that the time periods wherein the laser diode unit 10 is switched on and the heating element 18 is switched off overlap, so that, for example, the heating element 18 can have been switched on before the laser diode unit 10 is switched off. In the same way, the heating element 18 can remain switched on for a short period of time beyond the time when the laser diode unit 10 is switched on.

In a further non-illustrated embodiment of the invention, the carrier body 16 or the laser diode unit 10 and/or the housing thereof may be provided with a layer of thermal insulating material, so that variations in the environmental or ambient temperature have little or no influence upon the temperature of the laser diode units 10.

We claim:

1. A method for regulating the temperature in a printing plate imaging unit of a printing press, the imaging unit operable with laser light generated by a plurality of laser diode units that are switched on and off in accordance with an image pattern to be produced on the printing plate, which comprises:

providing a carrier body with a plurality of laser diode units, a plurality of heat sources, and a further heating device, each one of the plurality of heat sources disposed adjacent a respective one of the plurality of laser diode units;

preheating the entire carrier body with the further heating device; and operating each one of the plurality of heat sources alternatively with the respective one of the plurality of laser diode units so that the temperature of the plurality of laser diode units is maintained as constant as possible.

2. The method according to claim 1, which includes increasing the heat quantity per unit time emitted by one of the plurality of heat sources, in a switched-off state of the respective laser diode unit, and decreasing the heat quantity per unit time in a switched-on state of the respective laser diode unit.

3. The method according to claim 2, wherein the heat quantity per unit time emitted by the one of the plurality of heat sources is substantially equal to the heat quantity per time unit emitted by the respective laser diode unit.

4. The method according to claim 2, which includes operating the one of the plurality of heat sources in the switched-on state of the respective laser diode unit, so that the one of the plurality of heat sources emits a given basic heat quantity per unit time which is smaller than the heat quantity per time unit emitted by the respective laser diode unit, and operating the one of the plurality of heat sources, in the switched-off state of the respective laser diode unit, so that the one of the plurality of heat sources emits a second larger heat quantity, the first and the second heat quantities being of such value, that a temperature difference between the switched-on and the switched-off state of the respective laser diode unit is minimal.

5. The method according to claim 4, wherein the difference between the first and second heat quantities is substantially equal to the difference between the heat quantity emitted by the switched-on laser diode unit and the second heat quantity.

6. The method according to claim 1, which includes cooling the carrier body to a predetermined temperature.

7. The method according to claim 1, which includes thermally insulating at least one of the laser diode units and the heat against environment.

8. A device for regulating the temperature in a laser-operated printing plate imaging unit of a printing press, comprising:

a carrier body;

a plurality of laser diode units switchable on and off in accordance with a pixel pattern to be produced on the printing plate, said plurality of laser diode units disposed on the carrier body;

a plurality of electrical heating elements disposed on the carrier body, each one of said heating elements disposed adjacent a respective one of said laser diode units, each one of said heating elements for generating, alternatively with said respective laser diode unit, a first heat quantity in a switched-on state of said respective laser diode unit and a second larger heat quantity in a switched-off state of said respective laser diode unit; and a further heating device disposed on the carrier body for preheating the entire carrier body.

9. The device according to claim 8, wherein said second heat quantity is substantially equal to a heat quantity generated by said respective laser diode unit, and said first and smaller heat quantity has a value of zero.

10. The device according to claim 8, wherein said second heat quantity generated by one of said plurality of electrical heating elements in said switched-off state of said respective laser diode unit is of such value that said respective laser diode unit has a temperature equal to a predetermined reference value.

11. The device according to claim 10, wherein said first heat quantity generated by one of said plurality of electrical heating elements in said switched-on state of said respective laser diode unit has a value equal to said second heat quantity reduced by the difference between said heat quantity generated by said respective laser diode unit and said second heat quantity.

12. The device according to claim 8, wherein one of said electrical heating elements is formed of an electrical component for generating joulean heat, said one of said electrical heating elements connected to a source selected from a group consisting of electrical voltage and current sources in accordance with the heat quantity to be generated.

13. The device according to claim 12, including a control unit, and an electronic phase opposition circuit having a first power transistor controlled by said control unit for regulating current flow through said one of said electrical heating elements, and a second power transistor controlled by said control unit via an inverting Schmitt trigger switch for regulating current flow through said respective laser diode unit.

* * * * *